B. GOTLIEB.
CHECKING DEVICE FOR RUNAWAYS.
APPLICATION FILED APR. 5, 1915.

1,159,212.

Patented Nov. 2, 1915.

WITNESSES
Frank C. Palmer
Theo. G. Hoskins

INVENTOR
Barnet Gotlieb
BY
Munn & Co.
ATTORNEYS

COLUMBIA PLANOGRAPH CO., WASHINGTON, D. C.

UNITED STATES PATENT OFFICE.

BARNET GOTLIEB, OF NEW YORK, N. Y.

CHECKING DEVICE FOR RUNAWAYS.

1,159,212.  Specification of Letters Patent.  Patented Nov. 2, 1915.

Application filed April 5, 1915. Serial No. 19,193.

*To all whom it may concern:*

Be it known that I, BARNET GOTLIEB, a citizen of the United States, and a resident of the city of New York, borough of Manhattan, in the county and State of New York, have invented a new and Improved Checking Device for Runaways, of which the following is a full, clear, and exact description.

The object of the invention is to provide a new and improved checking device for runaway horses and other domestic animals, and arranged to enable a rider or driver to readily check the animal by depriving it of straight ahead vision, and to allow of accomplishing the same result in case a driver has temporarily left the vehicle and the animal imparts movement to the vehicle to which it is hitched.

In order to accomplish the desired result, use is made of shutters mounted on the blinders and normally in inactive position, and actuating means connected with the said shutters to allow of moving the same into active position in front of the eyes of the animal on which the blinders and checking device are used. Use is also made of means for attaching the controlling device for the shutters to a movable part of the vehicle so that when the latter is started by the animal in the absence of the driver the shutters are moved automatically into active position.

A practical embodiment of the invention is represented in the accompanying drawings, forming a part of this specification, in which similar characters of reference indicate corresponding parts in all the views.

Figure 1:
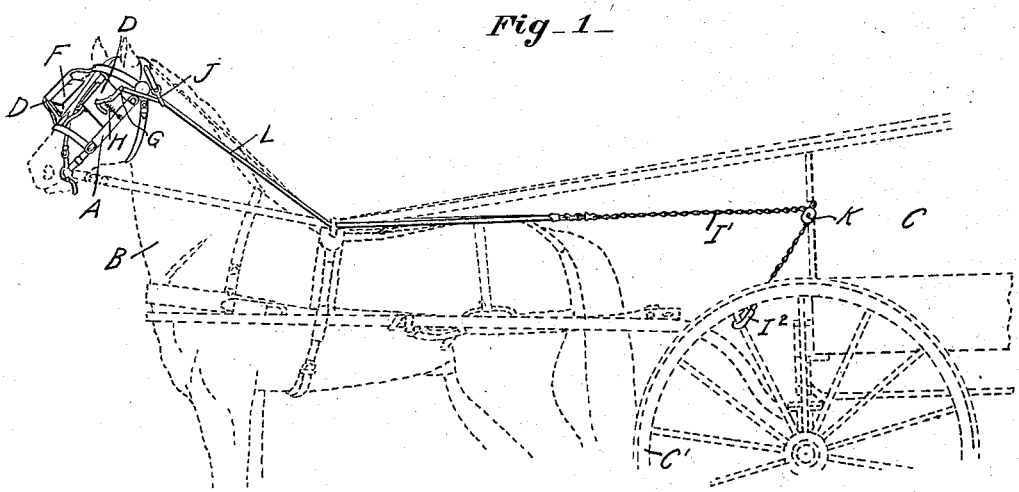
Figure 2:
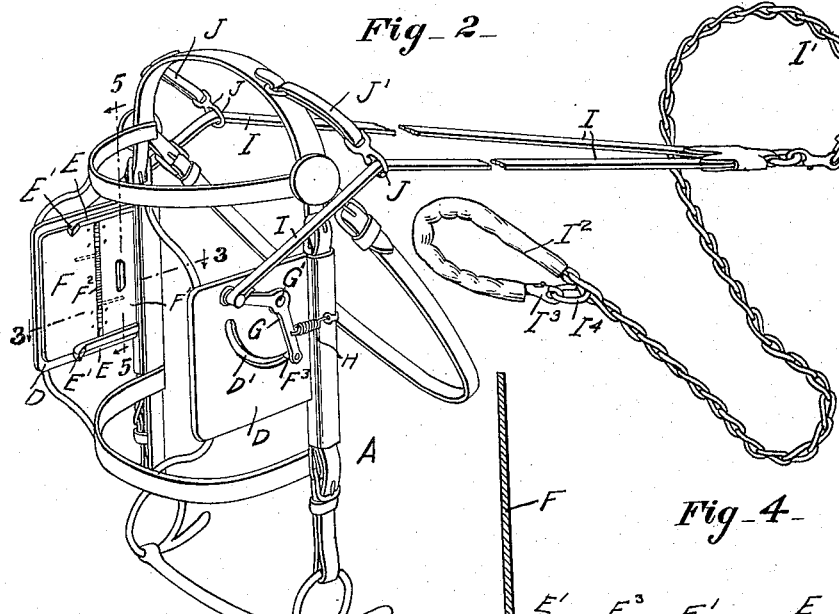
Figure 5:
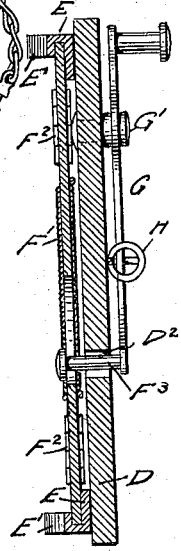
Figure 4:
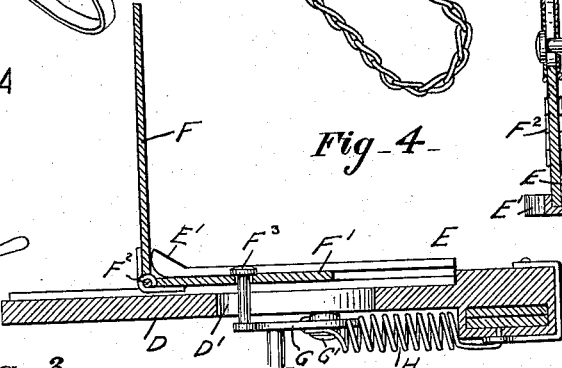
Figure 3:
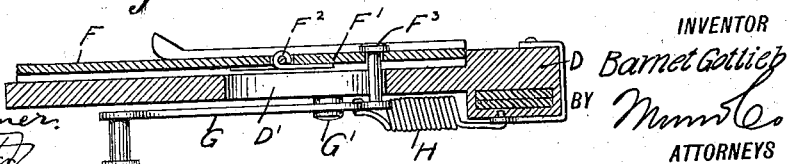

Figure 1 is a perspective view of the checking device as applied and showing the shutters in active position in front of the eyes of an animal hitched to a vehicle and while the animal is trying to run away; Fig. 2 is an enlarged perspective view of the checking device; Fig. 3 is an enlarged sectional plan view of the same on the line 3—3 of Fig. 2; Fig. 4 is a similar view of the same with the shutter in inactive position; and Fig. 5 is an enlarged cross section of the same on the line 5—5 of Fig. 2.

The checking device is applied to a tight-fitting headstall or bridle A of an animal B hitched to a vehicle C, as shown in Fig. 1, and the said headstall A is provided with blinders D of usual construction. On the inner faces of the blinders D are arranged top and bottom guideways E in which are mounted to slide shutters F normally overlying the inner faces of the blinders D but adapted to move into an approximately right angle position thereto and in front of the eyes of the animal B, as shown in Fig. 1, to deprive the animal of straight vision ahead and thus prevent the animal from running away. Each of the shutters F is provided with a rear section F' connected with the front of the main section by a spring hinge $F^2$. Normally each shutter F and its rear section F' are in inactive position in the guideways E, but when the section F' is moved forward until the spring hinge $F^2$ has passed the front ends of the guideways then the spring hinge $F^2$ causes the shutter F to swing inward into angular position in front of the animal's eye. The front ends of the guideways E are preferably enlarged as at E' to form a firm abutment for the shutter F when the latter swings into an angular position, as plainly indicated in Fig. 4. When the section F' is moved rearwardly then the abutments E' impart an outward swinging movement to the shutter F to allow the latter to enter the guideways E and thus hold the same flat against the inner face of the corresponding blinder D.

In order to actuate the shutter, the following arrangement is made: Each section F' of a shutter is provided with a transverse stud $F^3$ extending through a segmental slot D' formed in the corresponding blinder D, and the outer end of the stud $F^3$ is connected with one arm of a bell crank lever G fulcrumed at G' on the outside of the corresponding blinder D. A spring H attached to the blinder is connected with the bell crank lever G to normally hold the shutter F in rearmost inactive position, as shown in Figs. 2, 3 and 5. The other arm of the bell crank lever G is connected with the forward end of a strap I extending through an eye J held on a strap J' attached to the headstall A. The two straps I are connected at their rear ends with the front end of a chain I' extending over a pulley K held on the dashboard of the vehicle C. The rear end $I^2$ of the chain I' is preferably covered with leather or other material and terminates in a snap hook $I^3$ adapted to engage a link $I^4$ on the chain I'. The rear end of the chain I' thus forms a loop which can be readily taken hold of by the driver to pull on the chain and consequently on the straps I to impart a swinging motion to the bell crank levers G with a view to push the shutters F forward to allow the same to assume an angular position in front of the eyes of the animal, as previously explained, to deprive the animal of straight ahead vision. As is well known when such action takes place the animal does not run away. In case the driver temporarily leaves the vehicle, he disconnects the snap hook I³ from the ring I⁴ and passes the end I² around one of the spokes of a front wheel C' and then reëngages the snap hook I³ with the ring I⁴. Now it will be noticed that the chain I' and the straps I are held taut and should the animal become frightened for one reason or another and start to run away, then the vehicle wheel C' on being rotated exerts a pull on the chain I' and the straps I, to move the shutters F into active position to stop the runaway animal.

The checking device shown and described is very simple and can be readily applied to the blinders of headstalls as now generally constructed. It will also be noticed that normally the checking device is in inactive position, but in case of the animal starting to run away the driver can readily move the checking device into active position to prevent the animal from running away. In a like manner when the driver is temporarily passing from the vehicle and the chain I' is connected with the spoke of a wheel C' then the checking device is moved into active position whenever the animal draws the vehicle C forward.

Having thus described my invention, I claim as new and desire to secure by Letters Patent:

1. In a checking device of the class described, a pair of blinders, sectional shutters hingedly connected together and slidably mounted on the inner faces of the said blinders, and normally in inactive position, and actuating means connected with the said shutters to allow of moving the same into active position in front of an animal's eyes on which the blinders and checking device are used.

2. In a checking device of the class described, a head stall provided with blinders, guideways on the said blinders, shutters comprising sections pivotally connected together mounted to slide in the said guideways, and normally in inactive positions on the blinders, and actuating means connected with the said shutters to cause a section of the same to move into active position at a right angle to the blinders.

3. In a checking device of the class described, a headstall provided with blinders, guideways on the said blinders, shutters mounted to slide in the said guideways and normally in inactive positions on the blinders, each shutter being made of two sections, and a spring hinge connecting the sections with each other to allow of swinging the forward section into a right angle position relative to the rear section and to the blinders, bell crank levers fulcrumed on the said blinders and connected with the rear sections of the said shutters, springs pressing the said bell crank levers, and a flexible connection connected with the said bell crank lever to actuate the latter on exerting a pull on the said flexible connection.

4. In a checking device of the class described, a headstall provided with blinders, guideways on the said blinders, shutters mounted to slide in the said guideways and normally in inactive positions on the blinders, each shutter being made of two sections, and a spring hinge connecting the sections with each other to allow of swinging the forward section into a right angle position relative to the rear section and to the blinders, bell crank levers fulcrumed on the said blinders and connected with the rear sections of the said shutters, springs pressing the said bell crank levers, a flexible connection connected with the said bell crank levers to actuate the latter on exerting a pull on the said flexible connection, and means for connecting the free end of said flexible connection with a spoke of a vehicle wheel.

5. In a checking device of the class described, a headstall provided with blinders, guideways on the said blinders, shutters mounted to slide in the said guideways and normally in inactive positions on the blinders, each shutter being made of two sections, and a spring hinge connecting the sections with each other to allow of swinging the forward section into a right angle position relative to the rear section and to the blinders, bell crank levers fulcrumed on the said blinders and connected with the rear sections of the said shutters, springs pressing the said bell crank levers, a flexible connection connected with the said bell crank levers to actuate the latter on exerting a pull on the said flexible connection, and stops on the said guideways to limit the opening movement of the said front shutter sections.

6. In a checking device of the class described, a headstall provided with blinders, guideways on the said blinders, shutters mounted to slide in the said guideways and normally in inactive positions on the blinders, each shutter being made of two sections, and a spring hinge connecting the sections with each other to allow of swinging the forward section into a right angle position relative to the rear section and to the blinders, bell crank levers fulcrumed on the said blinders and connected with the rear sections of the said shutters, springs pressing the said bell crank levers, a flexible connection connected with the said bell crank levers to actuate the latter on exerting a pull on the said flexible connection, and guides on the said headstall and slidingly engaged by the said flexible connection.

7. In a checking device of the class described, a pair of blinders, sectional shutters hingedly connected together and slidably mounted on said blinders and normally in inactive position, and actuating means connected with the said shutters to allow of moving the same into active position in front of the eyes of an animal on which the blinders and checking device are used.

In testimony whereof I have signed my name to this specification in the presence of two subscribing witnesses.

BARNET GOTLIEB.

Witnesses:
 THOMAS F. QUINN,
 PHILIP ROSENZBEIG.

Copies of this patent may be obtained for five cents each, by addressing the "Commissioner of Patents, Washington, D. C."